(12) United States Patent
Spesser et al.

(10) Patent No.: US 11,283,366 B2
(45) Date of Patent: Mar. 22, 2022

(54) RECTIFIER ARRANGEMENT

(71) Applicant: Dr. Ing. h.c. F. Porsche Aktiengesellschaft, Stuttgart (DE)

(72) Inventors: Daniel Spesser, Illingen (DE); Tim Pfizenmaier, Leonberg (DE); Stefan Endres, Reichenschwand (DE); Christoph Sessler, Erlangen (DE)

(73) Assignee: Dr. Ing. h. c. F Porsche Aktiengesllschaft, Stuttgart (DE)

( * ) Notice: Subject to any disclaimer, the term of this patent is extended or adjusted under 35 U.S.C. 154(b) by 107 days.

(21) Appl. No.: 16/819,263

(22) Filed: Mar. 16, 2020

(65) Prior Publication Data
US 2020/0295669 A1    Sep. 17, 2020

(30) Foreign Application Priority Data

Mar. 14, 2019  (DE) .................... 10 2019 106 484.8

(51) Int. Cl.
| | |
|---|---|
| *H02J 7/00* | (2006.01) |
| *H02M 7/217* | (2006.01) |
| *H02J 7/02* | (2016.01) |
| *B60L 53/16* | (2019.01) |
| *B60L 53/18* | (2019.01) |
| *B60L 53/22* | (2019.01) |

(52) U.S. Cl.
CPC ............. *H02M 7/217* (2013.01); *B60L 53/16* (2019.02); *B60L 53/18* (2019.02); *B60L 53/22* (2019.02); *H02J 7/0042* (2013.01); *H02J 7/02* (2013.01); *B60L 2210/30* (2013.01); *H02J 2207/20* (2020.01)

(58) Field of Classification Search
CPC ........ H02M 7/217; B60L 53/22; B60L 53/16; H02J 7/0042
USPC ......................................................... 320/109
See application file for complete search history.

(56) References Cited

U.S. PATENT DOCUMENTS

| | | | |
|---|---|---|---|
| 5,430,639 A | 7/1995 | Takahashi | |
| 5,642,270 A * | 6/1997 | Green ................. | B60L 53/64 363/17 |
| 2013/0057200 A1* | 3/2013 | Potts .................. | H02J 50/80 320/107 |
| 2014/0375121 A1 | 12/2014 | Kouno et al. | |
| 2016/0315540 A1 | 10/2016 | Dilley et al. | |

(Continued)

FOREIGN PATENT DOCUMENTS

EP    2 226 926    9/2010

*Primary Examiner* — Suchin Parihar
(74) *Attorney, Agent, or Firm* — Gerald E. Hespos; Michael J. Porco; Matthew T. Hespos

(57) ABSTRACT

A rectifier arrangement (20) for rectifying an AC voltage into a DC voltage has a first connection (21), a second connection (22), a third connection (23) and a fourth connection (24), which rectifier arrangement (20) has an intermediate circuit (50) with a first line (51), a second line (52) and a node point (53), which node point (53) is connected to the first line (51) via at least one first capacitor (61) and to the second line (52) via at least one second capacitor (62), which first connection (21), second connection (22) and third connection (23) are each connected to a star point (40) via an associated circuit arrangement (31, 32, 33), which fourth connection (24) is likewise connected to the star point (40), and which star point (40) is connected to the node point (53) via a controllable switch (45).

12 Claims, 4 Drawing Sheets

(56) References Cited

U.S. PATENT DOCUMENTS

| | | | |
|---|---|---|---|
| 2020/0295670 A1* | 9/2020 | Spesser | H02J 7/02 |
| 2021/0129674 A1* | 5/2021 | Mayer | B60L 3/00 |

\* cited by examiner

RECTIFIER ARRANGEMENT

CROSS REFERENCE TO RELATED APPLICATION

This application claims priority under 35 USC 119 to German Patent Appl. No. 10 2019 106 484.8 filed on Mar. 14, 2020, the entire disclosure of which is incorporated herein by reference.

BACKGROUND

Field of the Invention

The invention relates to a rectifier arrangement.

Related Art

EP 2 226 926 A1 discloses an inverter that is able to generate different output voltages from a split DC voltage source using switches.

US 2014/0375121 A1 discloses a converter having a single-phase two-stage rectifier.

US 2016/0315540 A1 discloses a bidirectional AC-to-DC converter having two series-connected capacitors by way of which a potential reference is able to be produced on the DC voltage side.

U.S. Pat. No. 5,430,639 A discloses an AC-to-DC converter having a DC current intermediate circuit with chokes that are influenced using switches.

An object of the invention is to provide a novel rectifier arrangement and a novel vehicle having such a rectifier arrangement.

SUMMARY

A rectifier arrangement for rectifying an AC voltage into a DC voltage has a first connection, a second connection, a third connection and a fourth connection. The rectifier arrangement further has an intermediate circuit with a first line, a second line and a node point. The node point is connected to the first line via at least one first capacitor and to the second line via at least one second capacitor. The first, second and third connections are connected to a star point via an associated circuit arrangement. The fourth connection likewise is connected to the star point, and the star point is connected to the node point via a controllable switch. The switch allows a selective connection between the star point and the node point or a disconnection so that different properties of the rectifier arrangement are able to be achieved.

The circuit arrangements may be designed to allow a current between the circuit arrangement, on the one hand, and the first line and/or the second line, on the other hand. The circuit arrangements may thereby feed the intermediate circuit.

The rectifier arrangement may have a control device designed to influence the controllable switch and to permit automatic switching of the controllable switch.

The control device may be designed to switch the controllable switch either into the on state or into the off state during the entire rectification procedure on a connected supply grid. It is not necessary to switch over the switch during the rectification procedure as long as the connected supply grid remains unchanged.

The control device may be designed to generate a first value that is dependent on the supply grid that is connected to the connections, and further may be designed to influence the controllable switch depending on the first value. This makes it possible to influence the controllable switch depending on the connected supply grid.

The control device may be designed to generate the first value by checking whether the fourth connection is connected to a neutral conductor. It has proven to be advantageous to switch the controllable switch depending on whether a neutral conductor is present.

The control device may measure the potential at the fourth connection and to determine whether a neutral conductor is connected to the fourth connection on the basis of the temporal profile of the potential at the fourth connection. Since significantly lower potential fluctuations occur on a neutral conductor than on a phase connection or external conductor, it is able to be determined whether a neutral conductor or an external conductor is connected by measuring the potential at the fourth connection.

The control device may be designed to switch the controllable switch into the on state under the condition that the fourth connection is connected to a neutral conductor. In tests, this led to a reduction in leakage currents and to an increase in safety.

The control device may be designed to switch the controllable switch into the off state if the fourth connection is not connected to a neutral conductor. If no neutral conductor is connected, opening the controllable switch led to a reduction in the leakage currents in tests.

The rectifier arrangement may have a grid filter that allows a leakage current. Using such a grid filter improves the EMC properties of the entire circuit, and the optimization by virtue of suitably setting the controllable switch has a positive effect.

The controllable switch may be an electromechanical switch. Such switches, when open, have a high insulation effect, and fast switching is not necessary.

The controllable switch may be a relay. Relays are well-suited in terms of both electrical and mechanical properties.

In one embodiment, a vehicle, such as an electric vehicle or hybrid vehicle, has a corresponding rectifier arrangement. High-performance rectifier arrangements are required in vehicles, and the above-described rectifier arrangement has comparatively low leakage currents in spite of high power.

The vehicle may have a plug connector for connecting a charging cable for the vehicle, and there is at least temporarily galvanic coupling between the connections on the plug connector and the rectifier arrangement. According to one embodiment, the vehicle has a traction battery, and there is at least temporarily galvanic coupling between the connections on the plug connector and the traction battery. In such embodiments, the leakage currents in the rectifier arrangement also have an effect outside the vehicle since there is no galvanic isolation there.

Further details and advantageous refinements of the invention will emerge from the exemplary embodiments described below and illustrated in the drawings, which embodiments should in no way be understood as restricting the invention, and also from the dependent claims.

DETAILED DESCRIPTION

Figure 1:
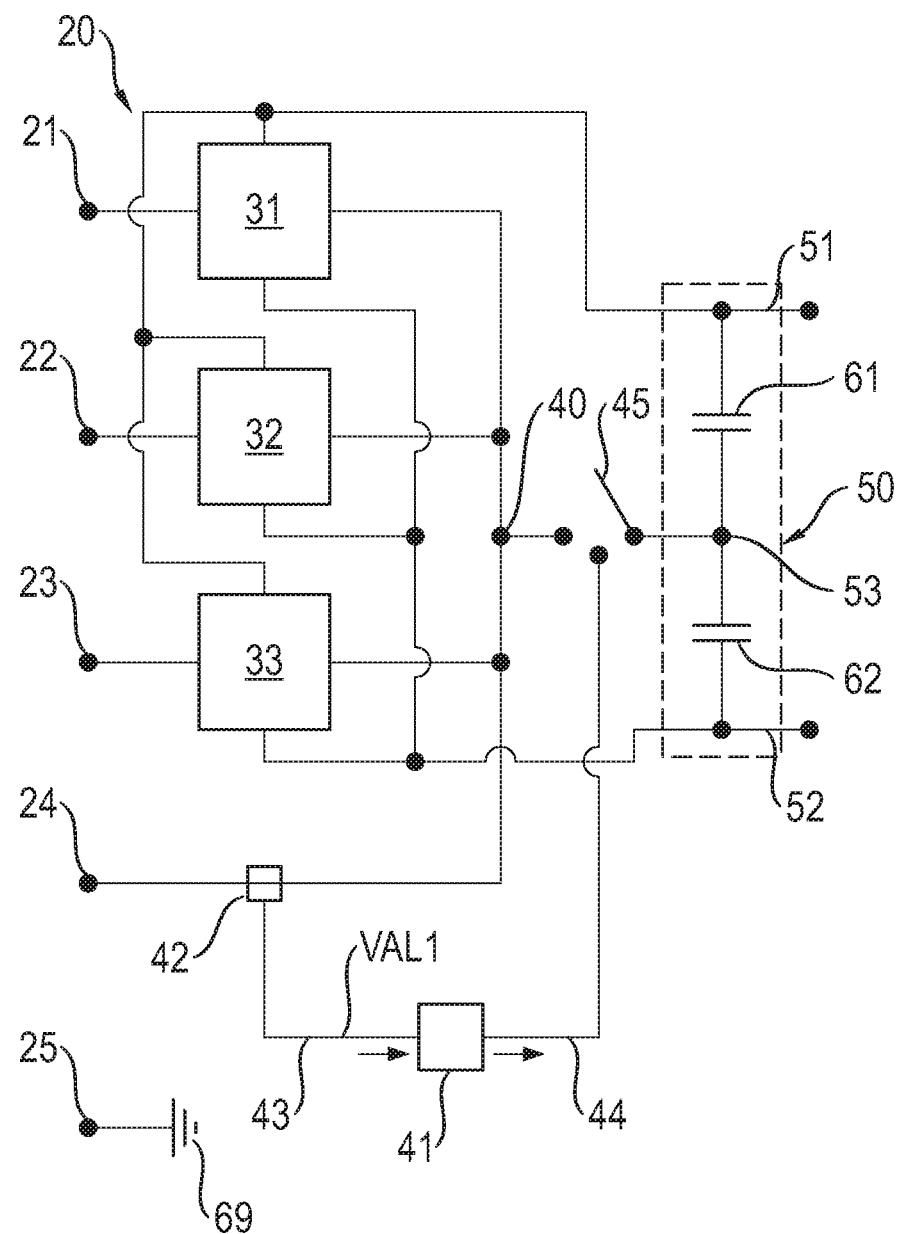
FIG. 1 shows a rectifier arrangement.

FIG. 1 shows a rectifier arrangement 20 for rectifying an AC voltage into a DC voltage. The rectifier arrangement 20 has a first connection 21, a second connection 22, a third connection 23 and a fourth connection 24. The rectifier arrangement 20 has an intermediate circuit 50 with a first line 51, a second line 52 and a node point 53. The node point 53 is connected to the first line 51 via a first capacitor 61 and to the second line 52 via at least one second capacitor 62. The capacitors 61, 62 are preferably intermediate circuit capacitors for storing energy in the intermediate circuit 50 and for smoothing the DC voltage on the lines 51, 52, and have a capacitance suitable for the respective application case. In the exemplary embodiment, the intermediate circuit is designed as a DC voltage intermediate circuit. The first connection 21, the second connection 22 and the third connection 23 are each connected to a star point 40 via an associated circuit arrangement 31, 32, 33, and the fourth connection 24 is likewise connected to the star point 40. The star point 40 is connected to the node point 53 via a controllable switch 45. The rectifier arrangement 20 preferably additionally has a fifth connection 25 via which a protective conductor PE of the supply grid is able to be connected. A protective conductor sign 69 is provided symbolically at the fifth connection 25, this being able to be used in the rectifier arrangement 20 and likewise being provided there with the reference sign 69. The supply grid may also be referred to as grid connection.

The circuit arrangements 31, 32, 33 are each designed to allow a current between the circuit arrangement 31, 32, 33, on the one hand, and the first line 51 or second line 52, on the other hand. In order to charge the capacitors 61, 62, a current preferably flows from the circuit arrangements 31, 32, 33 to the first line 51, and a current preferably flows from the second line 52 to the circuit arrangements 31, 32, 33. This leads to a higher potential in the first line 51 than in the second line 52. It is optionally also possible to generate a higher potential on the second line 52 than on the line 51.

The rectifier arrangement 20 has a control device 41 that is designed to influence the controllable switch 45, that is to say in particular to switch it into the on state or into the off state. The control device 41 is preferably designed to switch the controllable switch 45 either into the on state or into the off state during the entire rectification on a predefined supply grid. After it has been established, that is to say after the rectifier arrangement 20 has been connected to the supply grid 10, whether the controllable switch 45 should be in the on state or in the off state, the controllable switch 45 is switched accordingly, and the rectification takes place in this set state until the supply grid 10 is disconnected from the rectifier arrangement 20 or the rectification procedure is ended.

The control device 41 is preferably designed to generate a first value VAL1, which first value VAL1 is dependent on the supply grid 10 that is connected to the connections 21 to 24, and the control device 41 is designed to influence the controllable switch 45 depending on the first value VAL1.

The control device 41 is preferably designed to generate the first value VAL1 by checking whether the fourth connection 24 is connected to a neutral conductor.

The control device 41 is preferably designed to measure the potential at the fourth connection 24 and to determine whether a neutral conductor 14 is connected to the fourth connection 24 on the basis of the temporal profile of the potential at the fourth connection 24. If for example the potential at the fourth connection 24 is constant, this means that a neutral conductor 14 is connected to the fourth connection. If on the other hand the potential has a sinusoidal profile, this means that a phase, such as for example the HOT2 phase of a split-phase type US grid, is connected to the fourth connection 24.

The control device 41 is preferably designed to switch the controllable switch 45 into the on state under the condition that the fourth connection 24 is connected to a neutral conductor. When a neutral conductor 14 is present, this is preferably connected to the node point 53 via the switch 45.

The control device 41 is preferably designed to switch the controllable switch 45 into the off state under the condition that the fourth connection 24 is not connected to a neutral conductor.

As an alternative, the first value VAL1 may be generated via a user input by the user defining the grid to which the rectifier arrangement 20 is connected.

The potential at the connection 24 may also be measured using a measurement device 42, and it may be determined whether the fourth connection 24 is connected to a neutral conductor depending on the potential.

In larger overall devices, such as for example the charging infrastructure for an electric or hybrid vehicle, there are possibly already electronics that determine which supply grid 10 is connected to the vehicle. With corresponding knowledge, this information may be used to directly determine the first value VAL1. According to one preferred embodiment, the voltages at all of the active connections 21 to 24 are measured in order to reliably determine the connected supply grid.

If different plugs for connecting the supply grid 10 to the connections 21 to 24 are used for different grid connections 10, the information may also be provided via a signal for identifying the plug that is used.

Mode of Operation

There are different grid connections, and the rectifier arrangement 20 preferably functions with a number of grid connection variants that is as high as possible.

Figure 2:
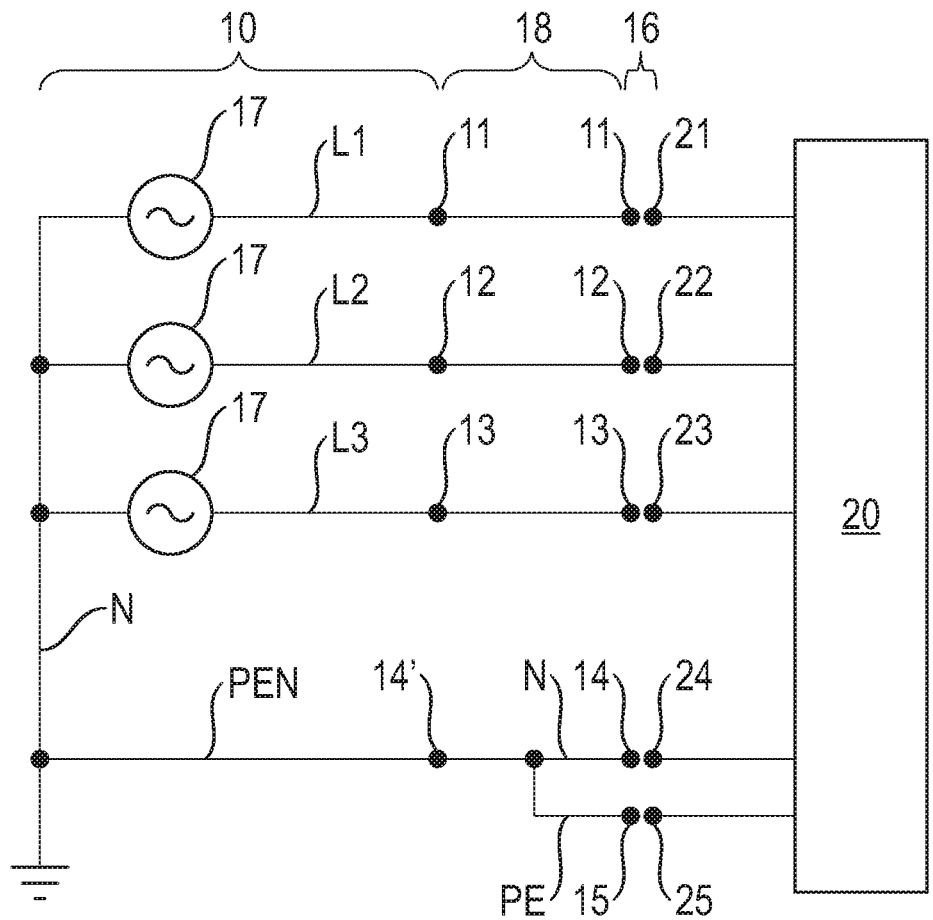
FIG. 2 shows a supply grid connected to the rectifier arrangement of FIG. 1.

FIG. 2 shows for example the conventional Central European supply grid 10, which is designed as a TN system with three phases L1, L2 and L3 that are available at associated connections 11, 12, 13, and with a star point 14' as neutral conductor. The three phases L1, L2 and L3 are supplied by the AC voltage sources 17 that have a respective phase difference of 120°. In the embodiment that is shown, the neutral conductor (N) 14' is earthed and thus likewise serves as a protective conductor (PE). This is referred to as PEN conductor. Many other grid connections, but not all of them, also have a neutral conductor. In an intermediate station 18, for example a home or a charging station, the PEN connection 14' is normally split into a neutral conductor connection (N) 14 and a protective conductor connection (PE) 15. The connections 11, 12, 13, 14, 15 may be connected directly to the connections 21, 22, 23, 24, 25 in order to operate the rectifier arrangement 20. For this purpose, a plug connector 16, via which the connections 21 to 25 are connected directly or indirectly to the supply grid 10, is for example provided in a vehicle. The connections 21 to 24, which are responsible for actually channeling currents, are also referred to as active connections 21 to 24.

If such a neutral conductor 14 is present and connected to the fourth connection 24, it is advantageous to connect the star point 40 of FIG. 1 to the node point 53 via the switch 45. The node point 53 is thereby set to the potential of the neutral conductor 14, and the voltage at the capacitors 61, 62, which is for example 800 V between the lines 51 and 52, is kept at +/−400 V with respect to the potential on the neutral conductor N. As a result, in the case of an insulation fault, the maximum voltage is kept comparatively low with respect to the potential on the neutral conductor N, and this improves safety. Without the connection of the neutral conductor 14 to the node point, on the other hand, the voltage on the first line 51 could for example be +600 V with respect to the neutral conductor, and the voltage on the second line 52 could be −200 V.

A further advantage is that the leakage currents that flow through the capacitors 63 and 64 to the protective conductor PE become lower due to the connection of the node point 53 to the fourth connection 24. The current at the capacitors 63, 64 drops.

In contrast to a supply grid 10 with a neutral conductor, the US supply grid called split phase has for example a first phase connection and a second phase connection, wherein the phase of the second phase connection is phase-shifted by 180° with respect to the phase of the first phase connection. The first phase connection is also referred to as HOT1, and the second phase connection is also referred to as HOT2. A neutral conductor may be provided, but it is not always provided. A protective conductor PE is often provided. In the case of a supply grid without a neutral conductor, the first phase connection HOT1 may be connected to one of the connections 21, 22, 23 or, in order to reduce the currents through the circuit arrangements 31, 32, 33, to all three connections 21, 22, 23, and the second phase connection HOT2 may be connected to the fourth connection 24. What is connected to the fourth connection 24 is thus not a neutral conductor, but rather the phase connection HOT2 that has a phase difference of 180° from HOT1. Tests using a charging device for an electric vehicle revealed that the leakage currents with a connection of the star point 40 to the node point 53 via the switch 45 are greater than without this connection. Specifically, with a connection or a switch 45 in the on state, leakage currents of the order of magnitude of 100 mA occurred. In the case of a switch 45 in the off state, the leakage currents on the other hand were considerably less than 10 mA. Fault current circuits have for example limit values of 10 mA or 3.5 mA depending on the respective supply grid 10. It is therefore advantageous to switch the switch 45 into the off state when a neutral conductor is not connected to the fourth connection 24.

In the case of a switch 45 switched into the off state, the potential at the node point 53 is not fixed at a potential predefined by the fourth connection 24, but rather it may fluctuate. This is referred to as free floating.

The controllable switch 45 may be an electromechanical switch. A relay also may be used for the controllable switch 45. Electromechanical switches have the advantage that they have a very low resistance in the on state and have a high insulation resistance in the off state. Since the controllable switch 45 does not normally change its state during the charging procedure, fast switching times are also not necessary.

Figure 3:
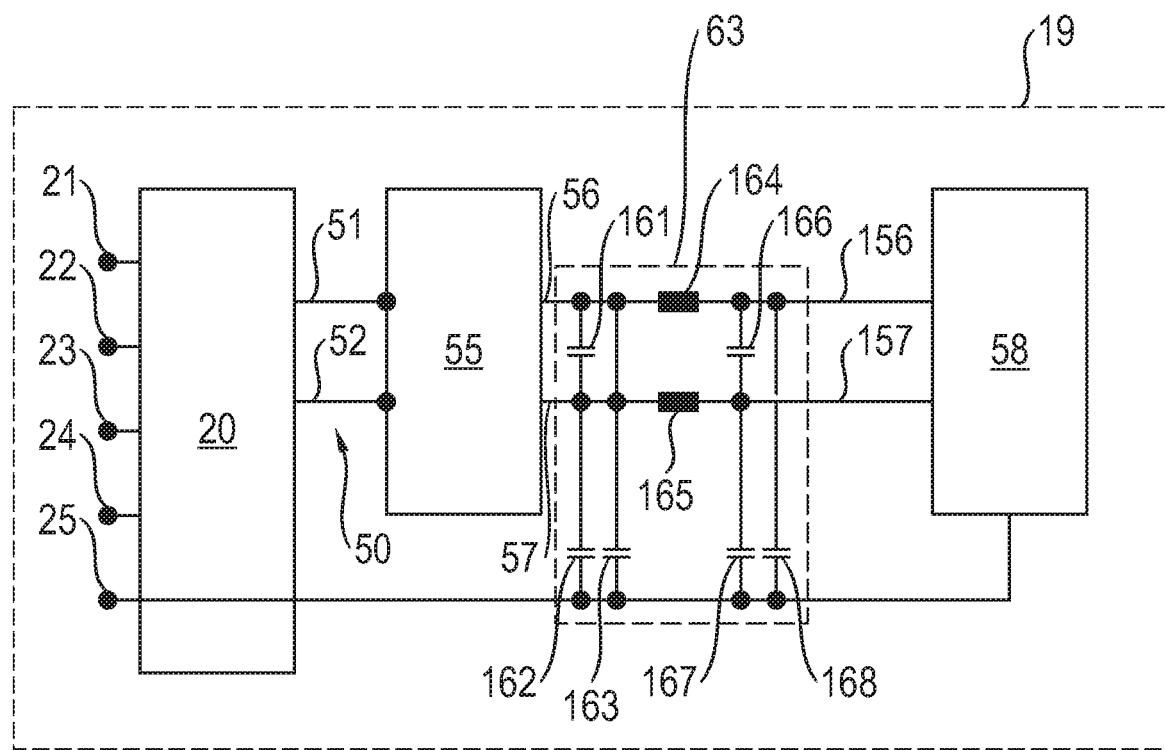
FIG. 3 shows an exemplary use of the rectifier arrangement in a vehicle.

FIG. 3 schematically shows a vehicle 19 in which the rectifier arrangement 20 of FIG. 1 is arranged. The first line 51 and the second line 52 are connected to a DC-to-DC voltage converter (DC-to-DC converter) 55 to supply same with energy from the intermediate circuit 50. The DC-to-DC voltage converter 55 may be a Buck converter.

Lines 56, 57 and an EMC filter 63 are provided at the output of the DC-to-DC voltage converter 55. The EMC filter 63 has an X-capacitor 161 that is connected between the lines 56, 57, a Y-capacitor 162 between the line 57 and the connection 25 (protective conductor PE) and a Y-capacitor 163 between the line 56 and the connection 25. The lines 56, 57 are then in each case connected to lines 156 and 157, respectively, via an inductor 164 and 165, respectively. There is then provision of an X-capacitor 166 that is connected between the lines 156, 157, a Y-capacitor 167 between the line 157 and the connection 25 (protective conductor PE) and a Y-capacitor 168 between the line 156 and the connection 25. The EMC filter 63 may also be designed to be multi-stage.

The Y-capacitors reduce interference voltages that occur with respect to the potential on the protective conductor connection 25. They usually have a lower capacitance than the capacitors 61, 62 of FIG. 1. Interference voltages are reduced by a leakage current flowing between the protective conductor connection 25 and the line 56 or 57. The X-capacitors attenuate the push-pull interference voltage between the connections 56 and 57. Leakage currents from or to the protective conductor PE arise via the EMC filter 63.

The lines 156, 157 are connected to a load 58, in particular a vehicle battery (traction battery) for a vehicle with an electric drive, or for example a heating device. No transformer is provided in the illustrated part of the vehicle 19 in the exemplary embodiment. Vehicles with a charging device for a traction battery usually have a transformer, and this leads to galvanic isolation between the external grid and the components on that side of the transformer within the vehicle. This results in leakage currents on the side of the transformer within the vehicle not having any effect on the side of the transformer outside the vehicle. This may also result in such leakage currents not tripping a grid safety mechanism. In the exemplary embodiment that is shown, on the other hand, a transformer and galvanic isolation are not present, and it is therefore advantageous to reduce the leakage currents by appropriately switching the switch 45.

Figure 4:
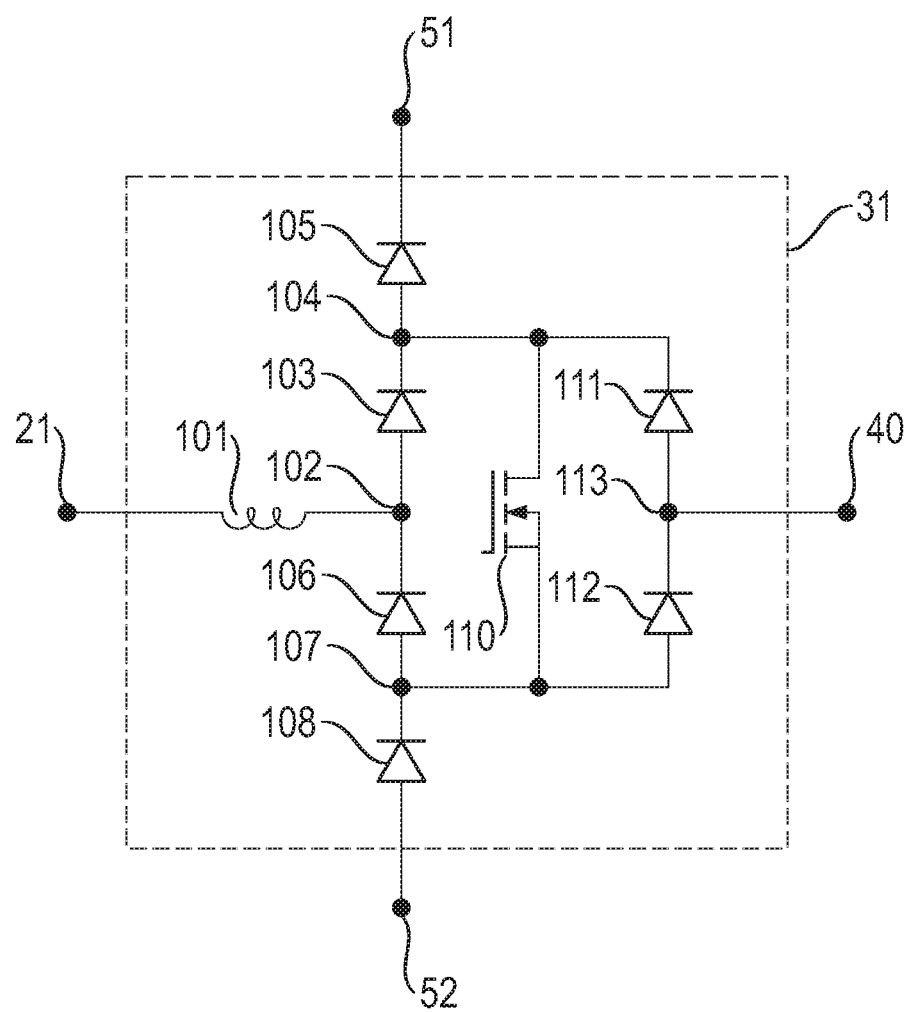
FIG. 4 shows an exemplary embodiment of a circuit arrangement of the rectifier arrangement of FIG. 1.

FIG. 4 shows, by way of example, an embodiment of the circuit arrangement 31 that may be used in the same form for the switching arrangements 32, 33. The switching arrangement is designed as a Vienna rectifier.

The first connection 21 is connected to a node point 102 via a coil 101. The node point 102 is connected to a point 104 via a diode 103, and the point 104 is connected to the first line 51 via a diode 105. The node point 102 is connected to a point 107 via a diode 106, and the point 107 is connected to the second line 52 via a diode 108. A switch 110 is provided between the points 107 and 104. The switch 110 is designed as a MOSFET in the exemplary embodiment, but other electronic switches, such as IGBTs, are also for example possible. The point 107 is connected to a point 113 via a diode 112, and the point 113 is connected to the point 104 via a diode 111. The point 113 is connected to the star point 40. The cathodes of the diodes 103, 105, 106, 108, 111, 112 are in each case connected on the side toward the first line 51, and the anodes are in each case connected on the side toward the second line 52. The operation of the Vienna rectifier is described for example in EP 0 660 498 A2.

A further embodiment of the switching arrangements 31, 32, 33 is for example a totem pole connection, such that the rectifier arrangement operates as a totem pole rectifier.

Variations and modifications are of course possible within the scope of the present invention.

In real embodiments, further components are preferably present, for example EMC filters, power factor controller, and/or insulation supervision circuits.

What is claimed is:

1. A rectifier arrangement for rectifying an AC voltage into a DC voltage, the rectifier arrangement comprising: a first connection, a second connection, a third connection and a fourth connection, the first connection, the second connection and the third connection of the rectifier arrangement being configured to be connected respectively to first, second and third phases of a supply grid, the fourth connection of the rectifier arrangement being configured to be connected to a neutral connector of the supply grid, the rectifier arrangement further having an intermediate circuit with a first line, a second line and a node point, the node point being connected to the first line via at least one first capacitor and to the second line via at least one second capacitor, the first connection, the second connection and the third connection are each connected to a star point via an associated circuit arrangement, the fourth connection also being connected to the star point, and the star point being connected to the node point via a controllable switch, the rectifier arrangement further having a control device configured to influence the controllable switch so that the control device switches the controllable switch into an on-state when the fourth connection is connected to the neutral conductor of the supply grid and so that the control device switches the controllable switch into an off-state under a condition that the fourth connection is not connected to the neutral conductor of the supply grid.

2. The rectifier arrangement of claim 1, wherein the circuit arrangements are each designed to allow a current between the circuit arrangement and at least one the first line and the second line.

3. The rectifier arrangement of claim 1, wherein the control device is designed to switch the controllable switch either into an on state or an off state during an entire rectification procedure on a connected supply grid.

4. The rectifier arrangement of claim 1, wherein the control device is designed to generate a first value that is dependent on the supply grid that is connected to the connections, and the control device is designed to influence the controllable switch depending on the first value.

5. The rectifier arrangement of claim 4, wherein the control device is designed to generate the first value by checking whether the fourth connection is connected to a neutral conductor.

6. The rectifier arrangement of claim 4, wherein the control device is designed to measure the potential at the fourth connection and to determine whether a neutral conductor is connected to the fourth connection on based on a temporal profile of the potential at the fourth connection.

7. The rectifier arrangement of claim 1, having a grid filter, which grid filter allows a leakage current.

8. The rectifier arrangement of claim 1, wherein the controllable switch is an electromechanical switch.

9. The rectifier arrangement of claim 1, wherein the controllable switch is a relay.

10. An electric vehicle or hybrid vehicle comprising the rectifier arrangement of claim 1.

11. The vehicle of claim 10, further comprising a plug connector for connecting a charging cable for the vehicle, and in which there is at least temporarily galvanic coupling between connections on the plug connector and the rectifier arrangement.

12. A rectifier arrangement for rectifying an AC voltage into a DC voltage, comprising:
a first connection, a second connection, a third connection and a fourth connection, the first connection, the second connection and the third connection being configured to be connected to first, second and third phases of a supply grid, the fourth connection being configured to be connected to a neutral conductor of the supply grid;
an intermediate circuit having a first line, a second line and a node point, the first line and the second line being configured to be connected to a DC-to-DC voltage converter and through the DC-to-DC converter to a battery, the node point being connected to the first line via at least one first capacitor and to the second line via at least one second capacitor;
the first connection, the second connection and the third connection are each connected to a star point via respective circuit arrangements, each of the circuit arrangements further is connected to the first line and to the second line, the fourth connection further being connected to the star point, and the star point being connected to the node point via a controllable switch;
wherein each of the circuit arrangements is designed to allow a current between the circuit arrangement and at least one of the first line and the second line, and wherein to charge the capacitors, a current flows from the circuit arrangements to the first line and a current flows from the second line to the circuit arrangements thereby providing a higher potential in the first line than in the second line.

* * * * *